United States Patent
Stein (10) Patent No.: US 10,226,901 B2
(45) Date of Patent: Mar. 12, 2019

(54) METHOD FOR ROUNDING EDGES OF POLYMER MOTOR VEHICLE COMPONENTS

(71) Applicant: Rehau AG + Co, Rehau (DE)

(72) Inventor: Helmut Stein, Hof (DE)

(73) Assignee: REHAU AG + CO, Rehau (DE)

( * ) Notice: Subject to any disclaimer, the term of this patent is extended or adjusted under 35 U.S.C. 154(b) by 208 days.

(21) Appl. No.: 14/760,708

(22) PCT Filed: Jan. 10, 2014

(86) PCT No.: PCT/EP2014/000049
§ 371 (c)(1),
(2) Date: Jul. 14, 2015

(87) PCT Pub. No.: WO2014/111243
PCT Pub. Date: Jul. 24, 2014

(65) Prior Publication Data
US 2015/0336332 A1 Nov. 26, 2015

(30) Foreign Application Priority Data
Jan. 16, 2013 (DE) .......................... 10 2013 100 420

(51) Int. Cl.
*B29C 69/00* (2006.01)
*B29C 67/00* (2017.01)
(Continued)

(52) U.S. Cl.
CPC .............. *B29C 69/001* (2013.01); *B23C 3/00* (2013.01); *B23K 26/38* (2013.01);
(Continued)

(58) Field of Classification Search
CPC ............ B29C 67/0029; B29C 67/0044; B29C 67/0048; B29C 69/001; B29C 59/00;
(Continued)

(56) References Cited

U.S. PATENT DOCUMENTS 2,633,441 A * 3/1953 Buttress .................... B28B 1/48
156/46
2,669,073 A * 2/1954 Bendickson .............. B24B 5/14
451/173
(Continued)

FOREIGN PATENT DOCUMENTS

DE 10 2004 004 194 8/2005
DE 10 2006 012 245 A1 10/2006
(Continued)

OTHER PUBLICATIONS

International Search Report, International patent application No. PCT/EP2014/000049; dated Jul. 24, 2014.

*Primary Examiner* — Matthew J Daniels
*Assistant Examiner* — Andrew D Graham
(74) *Attorney, Agent, or Firm* — Da Vinci Partners LLC; John Moetteli (57) ABSTRACT

A method is provided for producing a polymeric vehicle component, particularly an outer component in the form of a bumper, spoiler, sill, mud guard or the like. A polymeric shell part is first produced. Then, via a first automated process step, at least one aperture in the shell part is produced, which then defines an inner face in the shell part. Further, in a separate, second automatic process step, a radial embossing (R) is produced at a peripheral edge formed by an outer shell part surface and the inner face, in that a die with a contour corresponding to the desired radius (r) of the radial embossing (R) is pressed along the inner face against the peripheral edge. The die travels at least once along the complete peripheral edge, thus travelling along a path corresponding to the contour of the edge, such that all the peripheral edge is provided with the desired radial embossing.

15 Claims, 5 Drawing Sheets (51) Int. Cl.
| | |
|---|---|
| *B23C 3/00* | (2006.01) |
| *B23K 26/38* | (2014.01) |
| *B29K 23/00* | (2006.01) |
| *B29K 105/00* | (2006.01) |
| *B29L 31/30* | (2006.01) |
| *B23K 101/00* | (2006.01) |
| *B23K 103/00* | (2006.01) |

(52) U.S. Cl.
CPC ...... *B29C 67/0029* (2013.01); *B29C 67/0044* (2013.01); *B29C 67/0048* (2013.01); *B23C 2226/61* (2013.01); *B23K 2101/006* (2018.08); *B23K 2103/42* (2018.08); *B23K 2103/50* (2018.08); *B29K 2023/12* (2013.01); *B29K 2023/16* (2013.01); *B29K 2105/0088* (2013.01); *B29L 2031/3005* (2013.01); *B29L 2031/3044* (2013.01)

(58) Field of Classification Search
CPC . B29C 59/022; B29C 59/04; B29C 2059/027; B29C 2043/3277; B29C 2043/3692; B29C 2043/466; B29C 73/30; B23C 3/00; B23C 7/00; B23C 3/126; B26D 7/00; B26D 7/27; B30B 3/04; B30B 3/045; B30B 3/06; B30B 3/02; B30B 3/005; B26F 1/42; B26F 1/405
USPC .............................................. 83/14, 30, 869
See application file for complete search history.

(56) References Cited

U.S. PATENT DOCUMENTS

| | | | | |
|---|---|---|---|---|
| 3,212,541 A * | 10/1965 | Burrows | ................. | B23C 3/126 144/134.1 |
| 3,526,058 A * | 9/1970 | Price | ......................... | B24B 5/01 125/11.15 |
| 3,755,969 A * | 9/1973 | Stoy | ...................... | B24B 19/265 451/120 |
| 3,855,739 A * | 12/1974 | Van Der Meer | .......... | B24B 9/00 451/396 |
| 4,004,377 A * | 1/1977 | Laudick | ................ | B23Q 35/103 451/228 |
| 4,238,263 A * | 12/1980 | LoMaglio | ........... | B29C 67/0044 156/202 |
| 4,248,075 A * | 2/1981 | Whitley | ................ | B21D 19/005 29/829 |
| 4,356,053 A * | 10/1982 | LoMaglio | ........... | B29C 67/0044 156/107 |
| 4,485,061 A * | 11/1984 | Akhavi | ................... | B29C 37/02 264/1.29 |
| 4,813,187 A * | 3/1989 | Mushardt | ................. | B24B 1/00 451/130 |
| 5,033,237 A * | 7/1991 | Slough | ..................... | B24B 17/10 451/11 |
| 5,125,775 A * | 6/1992 | Breuer | ...................... | B23C 3/16 409/132 |
| 5,394,654 A * | 3/1995 | Shimbara | ................ | B24B 19/26 451/10 |
| 5,509,848 A * | 4/1996 | Shimbara | ............. | B23Q 1/5456 451/24 |
| 5,572,431 A * | 11/1996 | Brown | .................. | B29B 13/023 264/40.1 |
| 5,752,775 A * | 5/1998 | Tsutsui | ...................... | B24B 5/01 384/568 |
| 5,841,107 A * | 11/1998 | Riva | ........................ | B26F 1/165 219/243 |
| 5,859,775 A * | 1/1999 | Barlage, III | .......... | B29B 13/023 700/108 |
| 5,954,567 A * | 9/1999 | Nishio | .................... | B24B 9/065 451/41 |
| 6,089,799 A * | 7/2000 | Momochi | ................. | B23C 3/00 409/132 |
| 6,120,356 A * | 9/2000 | Jaskowiak | ................ | B24B 1/04 451/164 |
| 6,264,780 B1 * | 7/2001 | Iwanaga | ............... | B29C 47/003 156/130.7 |
| 6,752,184 B1 * | 6/2004 | Fisher | ..................... | B23C 5/006 144/176 |
| 7,237,989 B2 * | 7/2007 | Glaesser | .................... | B23C 3/18 409/120 |
| 9,227,253 B1 * | 1/2016 | Swift | ........................ | B23C 5/28 |
| 2002/0074257 A1 * | 6/2002 | Heath | ..................... | B29C 51/14 206/461 |
| 2002/0115391 A1 * | 8/2002 | Yamaguchi | ............... | B24B 5/22 451/49 |
| 2003/0199237 A1 * | 10/2003 | Bown | ...................... | B24B 5/04 451/49 |
| 2004/0040365 A1 * | 3/2004 | Misaki | ................... | B23P 15/406 72/466.9 |
| 2005/0079799 A1 * | 4/2005 | Montandon | ......... | B24B 27/0076 451/11 |
| 2005/0255793 A1 * | 11/2005 | Junker | ...................... | B24B 5/14 451/11 |
| 2006/0116052 A1 * | 6/2006 | Hori | ......................... | B24B 1/00 451/11 |
| 2006/0130624 A1 * | 6/2006 | Bocaccio | ............ | B29C 67/0044 83/14 |
| 2007/0023953 A1 * | 2/2007 | Hartmann | ............... | B29C 44/56 264/176.1 |
| 2007/0189869 A1 * | 8/2007 | Harif | ........................ | B23C 5/10 409/234 |
| 2007/0234859 A1 * | 10/2007 | Winkler | .................... | B26D 7/27 83/13 |
| 2008/0229893 A1 * | 9/2008 | Shepard | ................. | B21D 37/01 83/697 |
| 2008/0274676 A1 * | 11/2008 | Kozak | ....................... | B24B 5/04 451/177 |
| 2009/0255213 A1 * | 10/2009 | Schwartau | .......... | B29C 67/0044 52/794.1 |
| 2009/0294998 A1 * | 12/2009 | Ogawa | .................... | B29C 59/04 264/284 |
| 2010/0324535 A1 | 12/2010 | Triel | | |
| 2011/0081839 A1 * | 4/2011 | Lancaster | ................. | B24B 9/00 451/57 |
| 2012/0282045 A1 * | 11/2012 | Dressler | .................... | B23C 5/04 407/58 |
| 2013/0115023 A1 * | 5/2013 | Haimer | ..................... | B23C 5/26 409/234 |
| 2013/0149063 A1 * | 6/2013 | Charlesworth | ........... | B23C 3/30 409/132 |
| 2014/0161544 A1 * | 6/2014 | Morandeau, Sr. | ........ | B23C 3/13 407/40 |
| 2015/0331412 A1 * | 11/2015 | Adair | .................... | B29C 67/0055 700/126 |
| 2015/0336179 A1 * | 11/2015 | Haimer | ..................... | B23C 5/26 279/4.03 |

FOREIGN PATENT DOCUMENTS

| | | |
|---|---|---|
| DE | 10 2005 048295 A1 | 4/2007 |
| DE | 10 2007 009 114 | 8/2008 |
| EP | 1 170 099 A2 | 1/2002 |
| JP | S54-104092 | 8/1979 |
| JP | 2011-218373 A | 11/2011 |

* cited by examiner

METHOD FOR ROUNDING EDGES OF POLYMER MOTOR VEHICLE COMPONENTS

CROSS REFERENCE TO RELATED APPLICATIONS

This application is the National Stage of International Application No. PCT/EP2014/000049, filed Jan. 10, 2014, which claims benefit under 35 USC § 119(a), to German patent application Ser. No, 10 2013 100 420.2, filed Jan. 16, 2013.

The invention relates to a method for producing a polymeric vehicle component, in particular an external add-on part in the form of a bumper, spoiler, rocker panel, mud guard or the like, wherein firstly, preferably by means of an Injection moulding process, a polymeric shell part is produced.

Especially with larger plastic injection moulded parts for the automotive industry, apertures in the form of holes or otherwise, for example, elongated recesses, are created following on the injection moulding process in order to avoid flow lines. Such apertures are needed, for example, in modern bumpers to provide clip holes for attachments, parktronic systems, cut-outs for tow bars, headlight washers, side markers, or the like.

In the prior art the required apertures are usually prepared by means of a punching process. Here the resulting sharp edges at the punch edges are rounded by means of a special shape of the punch (see FIGS. 1 and 2).

A disadvantage of the conventional stamping process to produce the apertures is the danger of white fracture on the cut surfaces, which can significantly deteriorate the appearance. Another disadvantage are the very high costs associated with the application of the stamping process. Thus for example separate punching tools and appropriate replacement tools are required for each hole geometry. The punching machines used (see representation in FIG. 1) are usually only applicable for a specific article, thus for example, use of an exact bumper form. This calls for high-costs in the case of item changes (e.g. as facelift or an entirely new model), because, in addition to new stamping tools, the corresponding punching device has to be completely redesigned. A further disadvantage is that the embossing radii generated with the correspondingly shaped punch at the edge of the opening especially in curved surfaces can be uneven. Furthermore, there is a limited design freedom in product design because the design of the punching machine is restricted. Overall, with the punching process a very inflexible and expensive process for generating breakthroughs in polymer automotive components is involved.

Against the described background, the present invention has the object to provide a method by way of which apertures with defined embossing radii, but also external boundaries with defined embossing radii, can be produced easily and flexibly.

According to the invention the object is achieved by a method for producing a polymer automotive component, in particular an external add-on part in the form of a bumper, spoiler, rocker panel, mud guard or the like,
wherein firstly, preferably by means of an injection moulding process, a polymeric shell part is produced, thereafter optionally by means of a first automatic process step least one aperture is produced in the shell part, which then defines an inner face of the shell part and, whereafter in a separate, second automatic process step a radial embossing takes place against, the outer shell part surface and inner face formed peripheral edge and/or an outer edge of the shell part outer edge is produced, in that a die with the desired radius of embossing corresponding contour is pressed along the inner face against the peripheral edge and/or is pressed along the outer rim of the shell part against the outer edge.

Thus according to the invention, the usual prior art stamping method, taking simultaneously place with the stamping process, is ignored. Instead, according to the invention, a two-stage process is used, which significantly increases the flexibility and significantly reduces the costs of the process for the production of apertures with rounded edges. First, in a first method step the production of the aperture, which may have the shape of e.g. a circular hole, an elongated hole or any other aperture. This aperture is especially required for the integration of certain additional elements, e.g. in the form of additional add-on parts, needed for example to allow for a bumper proper function and/or installation of parking sensors, headlight cleaning systems or the like. A second, separate process step is then carried out on the radial embossing resulting in the generation of the aperture peripheral edge, which represents the transition of the generated inner boundary of the aperture to the outer shell part surface. This transition is generally sharp-edged and usually has to be smoothened by the radial embossing. This radial embossing take place inventively by way of a die having a desired radius of the corresponding contour. This die is pressed along the inner face against the peripheral edge, allowing a local material flow to be initiated at the sharp edge with an accompanying rounding of the edge. The separation of production of the aperture in a first process step and radial embossing formation to that created of the sharp circumferential edge by a separate second step allows for maximum flexibility, since the aperture formation no longer matters. Thus, this much more cost-effective method can be used to produce the aperture than as is the case with the prior art stamping process. A further advantage is that when using the method according to the invention there is no white fracture risk in the region of the aperture. The aperture is then provided in the finished manufactured automotive component usually with a movable (e.g., headlight cleaning system), solid (e.g., parking sensor) or removable (e.g. towing hook) screening element. Preferably, the inner face is designed to be integrally, so that the aperture is completely surrounded by material of the motor vehicle component. However, within the scope of the invention is also the production and processing of apertures, which are produced at the edge of the motor vehicle component, so that the inner boundary of the aperture immediately adjoins the exterior boundary of the vehicle component.

Alternatively or in addition to the above-described radial embossing at apertures, the inventive teaching can also be used to provide the outer face of the shell part, preferably in some regions with a defined radial embossing.

The inventive method is in particular also then suitable, insofar that the shell part is painted prior to the radial embossing, preferably also before the production of the apertures, with at least one lacquer layer. Consequently, by means of the inventive second process step for radial embossing also at the peripheral, sharp edge immediately adjacent, painted area of the outer shell part surface be formed without damage, so that overall there results an excellent appearance of the varnished polymeric component. Usually several layers are applied in the coating of polymeric automotive components, for example in the form of a base and subsequent topcoat.

In the context of the invention it is in particular provided that the radial embossing is carried out without cutting. This means that only by means of the die in the region of a local deformation of the sharp, peripheral edge on the polymeric component, such as is the case with stamping process known in the prior art stamping process. Within the scope of the invention, it is here provided in particular that the die moves without self-rotation along the inner boundary and is thereby pressed against the peripheral edge and/or along the outer rim of the shell part against the outer edge. Consequently, in accordance with the invention, a local press method is applied in the region of the sharp, peripheral edge or the outer edge whereby the contact pressure of the die, a local flow of the polymeric material is caused, which leads to smoothing in the form of the desired radial embossing.

In the context of the invention it is in particular provided that the production of the aperture and/or radial embossing is CNC-controlled. The term CNC means "Computerized Numerical Control" and represents an electronic method for controlling and regulating machine tools and related equipment. The CNC control allows for maximum flexibility, since the manufacturing process is based on a corresponding computer program which, for example, is based on CAD data of the component to be produced so that without great effort a component change is required. If a shell part change is required, then only a reprogramming of the two process steps must be carried out while a constructive transformation of the tools or the entire device—is as is required for the stamping process—is fully omitted. Thus, the inventive method has a high level of flexibility.

In particular in the context of the invention the aperture is produced by means of a rotating milling head or by means of a laser beam. Basically the tool to produce the aperture can be computer controlled. The same applies to the die for radial embossing which is explained in more detail hereafter. The die can be clamped by automatic tool change, e.g. alternating with the milling head to produce the aperture, or alternatively be integrated into the milling head reception. In milling machines with continuous drive spindle, the second output side can serve as a seat for the die.

At least one additional attachment for the automotive component is mounted by means of a joining process of radial embossing. This joining process can be, for example, sticking on or welding to. The add-on parts to be joined can be, for example, for adapter parktronic systems, framework for head light cleaning modules or sidemarker housing (housing for side-marker lamps).

The embossing radius generated by the die is advantageously 0.01 mm to 5 mm, preferably 0.1 mm to 3 mm. Suitably, the embossing radius is selected to be so small that the sharp-edgeness of the transition from the inner edge to outer construction part surface is completely eliminated and thereby the appearance of the component surface in the peripheral edge immediately adjacent area remains largely unaffected. The embossing depth that defines the area affected by the radial embossing amounts to 0.05 to 0.4, for example, 0.1 to 0.3 mm.

The die is suitably formed, cylindrically and has, on its face side serving for component processing, at least two tool surfaces, whereby the annular transition region between the two tool surfaces forms the region of the component processing. Advantageously, the tool surfaces in this case are conical and have different inclinations relative to the tool axis. On these two conical tool surfaces one or more further, for example, curved, surfaces of the face side of the stamping tool can join. Essential to the invention is the design of the two tool surfaces in the immediate vicinity of the component processing. So for example, the outer mould surface includes with the tool axis an angle α of 55° to 85°, preferably 65° to 75°. Against this the inner tool surface includes with the tool axis preferably an angle of 15° to 45°, in particular 25 to 35°.

It is also within the scope of the present invention, that, in addition the radial embossing with the die, a simultaneous processing of the peripheral edge facing away from the lower portion of the inner face takes place. This processing may particularly be designed so that the lower portion of the inner face receives a conical shape with a corresponding conical contour of the die, which preferably tapers toward the circumferential edge. This conical shape can be used, for example, for clamping a corresponding supplementary attachment (e.g. parking sensor holder or the like).

The polymeric component preferably consists of a thermoplastic plastic, for example, polypropylene-based, in particular a PP/EPDM blend.

The invention is explained hereafter merely referring to a drawing depicting an embodiment. Shown schematically are.

Figure 1:
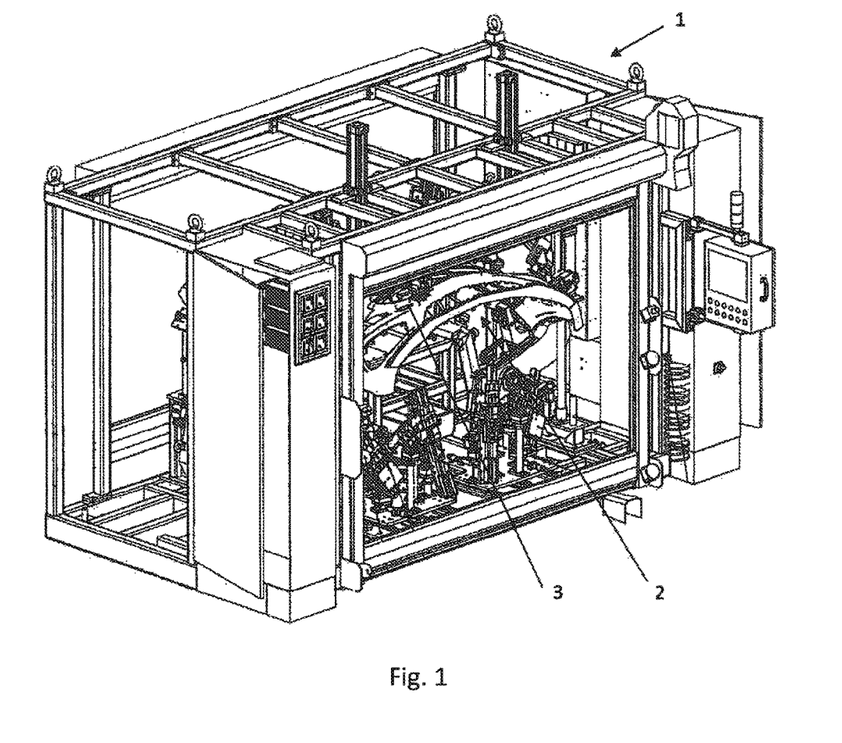
FIG. 1: punching apparatus for producing openings in a polymeric vehicle component according to the prior art.

FIG. 1 shows a punching device 1 known in the prior art, which conventionally is applied for producing perforations in polymeric automotive components. Such a motor vehicle component in the form of a bumper 2 can also be seen in FIG. 1. At the punching machine 1 depending on the apertures to be the produced, of which an aperture 3 is clearly visible in FIG. 1, a variety of punches is mounted, of which a punch is 4 exemplarily shown in FIG. 2. The sectional view of the punch 4 in FIG. 2 on the left shows that this is provided in the processing region 5 with a radius $r_{st}$ which serves for radial embossing. In particular, with reference to the right 3D representation of the punch 4 it can be seen that this is formed cylindrically and can be used accordingly only for the manufacture of a circular hole with a precisely defined diameter. By using the radial embossing generated by the stamping process the sharp peripheral edge of the corresponding aperture is smoothened.

Figure 2:
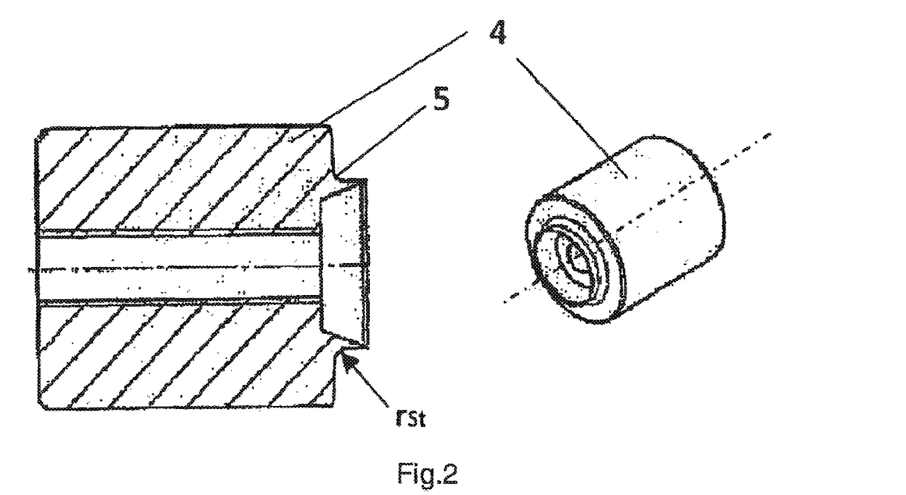
FIG. 2: a punch to generate corresponding apertures according to the prior art in two different representations.

According to the inventive method, the prior art stamping method shown in FIG. 1 and FIG. 2 is refrained from. In the example of the embodiment—in analogy with the prior art, by means of an injection moulding process, not shown, the bumper 2 initially is produced in the form of a polymeric shell part 6 (cf. FIG. 4-6.). Thereafter by means of a first automated process step, at least one aperture 3 is produced in the shell part 6, which then defines an inner face 7 of the shell part 6. A radial embossing R is subsequently performed, in a separate, second automated process step, on the edge 9 formed between surface 8 of outer shell part and inner peripheral face 7 (which edge is usually sharp due to the production method chosen for the preparation of the aperture 3) by die 10 having a desired corresponding contour radius r with a force F along and against the inner face 7 whereby the peripheral edge 9 is suppressed. In the context of the invention, in this case, the raw part 6 is coated prior to the generation of the aperture with one or more (not shown) paint layers.

Figure 3:
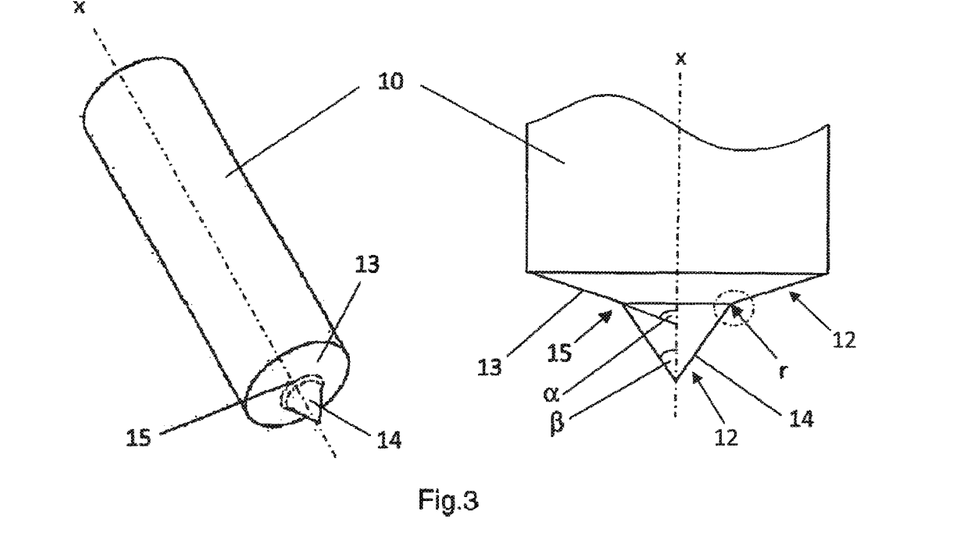
FIG. 3: an inventive die for radial embossing in two different representations.

The FIG. 3 shows an inventive die 10 in different presentations. On the left, a three-dimensional representation of such a die 10, on the right, this die 10 is partially enlarged in the region of the processing zone 15 which is shown in a side view. It will be appreciated that the outer surface of the die 10 is a surface of rotation. At its face side 12, serving for component processing, two radial tool surfaces 13, 14, are provided wherein the annular transition region 15 between the two tool surfaces 13, 14 forms the area of the component processing. This transition region 15 has a radius r of 0.01 mm to 5 mm, preferably 0.1 mm to 3 mm, which corresponds to the embossing radius produced by the die 10. In particular, in the right hand illustration in FIG. 3, it is apparent that the tool surfaces 13, 14 are conically shaped towards the tool axis x with different indication angles α, β. Thus the outer tool surface 13 is oriented, with respect to the tool axis x, at an angle α of 65° to 75°, while the inner tool surface 14 is oriented, with the tool axis x, at an angle β of 25° to 35°. In order to create the smoothest possible surface in the region of radial embossing R, the annular transition region 15 is polished.

Figure 4:
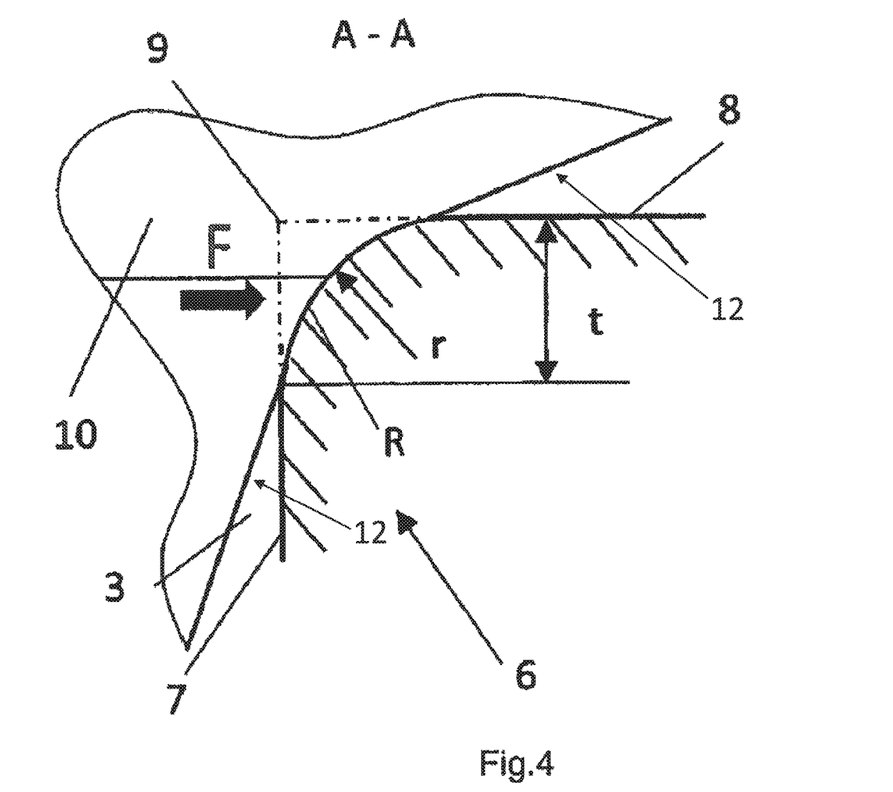
FIG. 4: an inventive method for producing radial embossing in a detailed illustration corresponding to section A-A in FIG. 5, FIG. 5: the method shown in FIG. 4 in cross-section in a plan view
Figure 5:
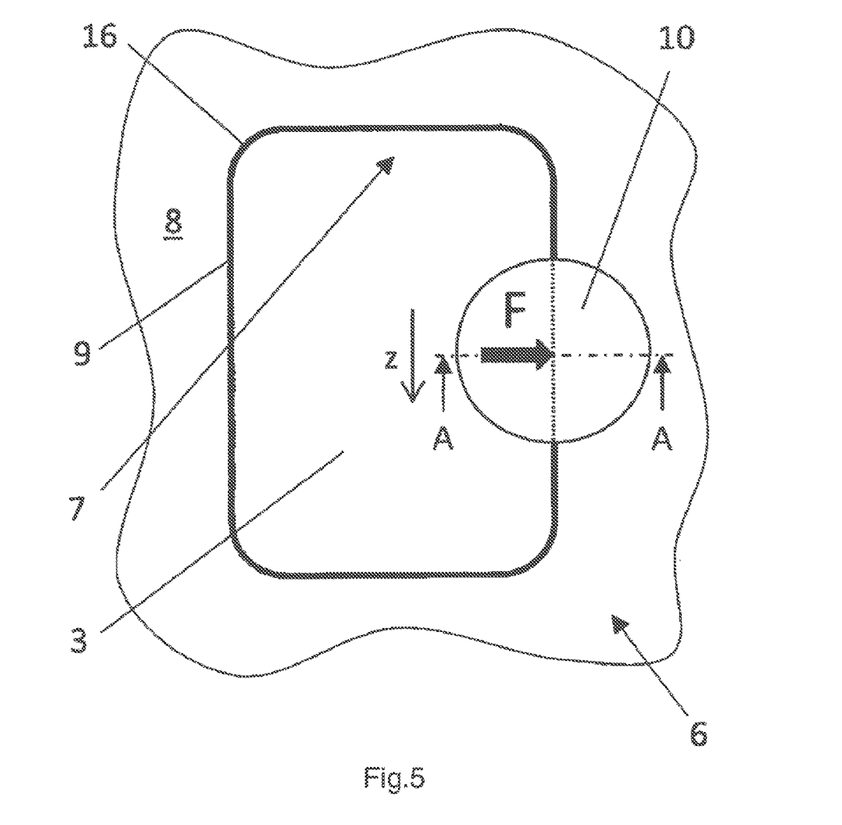

The FIG. 4 now shows in conjunction with the FIG. 5 a detailed representation of a method of the invention, in which FIG. 4 shows the region of the die 10 indicated by the dashed circle in FIG. 3. The aperture 3 in the shell part 6 especially visible in FIG. 3 has a rectangular shape with rounded corners 16 and serves as completed (in finished manufactured bumper 2 by means of a movable closeable aperture) opening for a headlight cleaning system. This aperture is generated by means of a tool (not shown) in the form of a rotating milling head or by means of a laser beam, whereby the production of the aperture is CNC-controlled. During the production of the aperture 3, a circumferential, sharp edge 9, which is illustrated by dashed lines in FIG. 4, is formed. The removal of these sharp edges takes place by means of the second method step of a radial embossing R by means of the inventive die 10. This can be clamped by an automatic tool change or be integrated into the milling head pick up. The generation of the radial embossing R is done without cutting. The die 10 moves without self-rotation, i.e. in the form of a purely translational motion, along the inner face 7 in the z-direction method (see FIG. 5) and this pressed under force F against the circumferential, sharp edge 9. This results in a local flow of the polymeric material in the region of the sharp edge 9, which thus receives a radial embossing R, as shown in FIG. 4 by the corresponding solid line. The embossing radius r generated by the die 10 amounts to 0.01 mm to 5 mm, e.g., 0.1 to 3 mm. The embossing depth t, which defines the regions affected by the radial embossing R region of the inner boundary 7, is 0.05 to 0.4, for example, 0.1 to 0.3 mm. If the die 10, which describes the peripheral edge 9 at least once completely in FIG. 5, thus having described a pathline corresponding to the contour of the edge 9, thus the entire peripheral edge 9 is provided with the desired radial embossing R.

Figure 6:
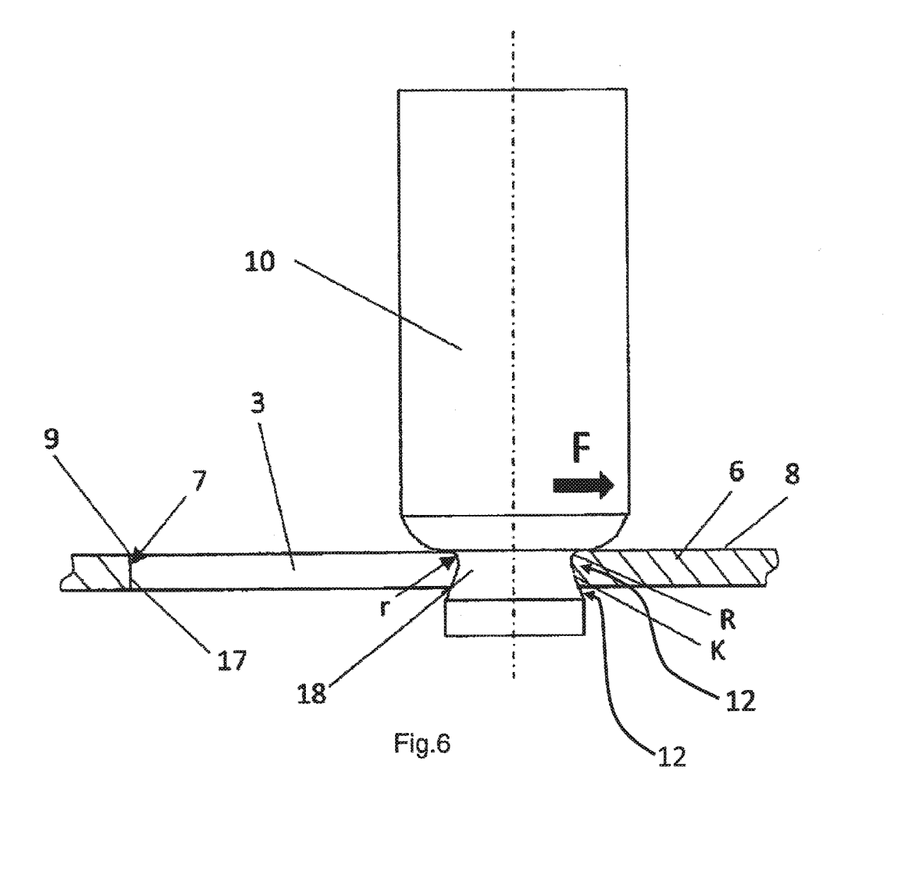
FIG. 6: an alternative inventive die.

The FIG. 6 shows an alternative embodiment of a die 10 according to the invention. By means of this die 10 in addition to radial embossing R a simultaneous processing facing away from the lower inner region 17 the inner face 7 of the peripheral edge 9 takes place. Hereby the lower portion 17 of the inner face 7 receives a conical shape K corresponding conical contour 18 of the die 10, which tapers towards the peripheral edge 9. This conical shape K, for example, serves to clamp housings, which are intended to accommodate parking sensors or the like.

The invention claimed is:

1. Method for producing a polymeric vehicle component, wherein firstly, a polymeric shell part, is produced;
   whereafter by means of a first automated process step, at least one aperture in the shell part having an outer shell part surface is produced, which then defines an inner face in the polymeric shell part and a peripheral edge therebetween;
   whereafter in a separate, second automatic process step, a radial embossing (R) is produced at the peripheral edge, in that a die with a contour corresponding to the desired radius (r) of the radial embossing (R) is pressed along the inner face against the peripheral edge;
   wherein the die travels at least once along the complete peripheral edge, thus travelling along a path corresponding to the contour of the edge, such that all the peripheral edge is provided with the desired radial embossing (R);
   wherein the die has a radial face, has at least two tool surfaces at its face defining therebetween an area serving for component processing, and an annular transition zone between the two tool surfaces which forms the area serving for component processing;
   wherein both tool surfaces are conical adjacent to the annular transition zone and have different angles of inclination with respect to the tool axis (x);
   wherein the outer tool surface forms an angle (α) of 55 to 85° with the tool axis (x); and
   wherein the inner tool surface forms an angle (β) of 15 to 45° with the tool axis (x).

2. Method according to claim 1, wherein the polymeric shell part is coated with at least a layer of lacquer before producing the radial embossing (R).

3. Method according to claim 1, wherein the radial embossing (R) is carried out without material removal.

4. Method according to claim 1, wherein the die is driven without self-rotation along the inner face and is thereby pressed against the peripheral edge.

5. Method according to claim 1, wherein the production of the aperture and/or the radial embossing (R) is CNC-controlled.

6. Method according to claim 1, wherein the aperture is produced by means of a rotating milling head or by means of a laser beam.

7. Method according to claim 6, wherein the die is clamped during change in the automatic tool from one head to another or is integrated into a milling head reception.

8. Method according to claim 1, wherein, after the radial embossing (R), at least one add-on part is mounted on the vehicle component by means of a joining process.

9. Method according to claim 1, wherein the radial embossing (R) produced by the die, amounts to 0.01 to 5 mm.

10. Method according to claim 1, wherein, in addition to radial embossing (R), a simultaneous machining of the peripheral edge facing away from a lower portion of the inner face is carried out with the die simultaneously with the radial embossing (R).

11. Method according to claim 10, wherein the lower portion of the inner face receives, by way of a corresponding cone contour of the die, a conical shape (K).

12. The method according to claim 2, wherein the radial embossing (R) produced by the die amounts to 0.1 to 3 mm.

13. The method according to claim 1, wherein the outer tool surfaces includes an angle (α) of 65 to 75° with the tool axis.

14. The method according to claim 1, wherein the inner tool surface includes an angle (β) of 25° to 35° with the tool axis (x).

15. A method for producing a polymeric vehicle component,
wherein firstly, a polymeric shell part, is produced;
whereafter by means of a first automated process step, at least one aperture in the shell part having an outer shell part surface is produced, which then defines an inner face in the polymeric shell part and a peripheral edge therebetween;
whereafter in a separate, second automatic process step, a radial embossing (R) is produced at the peripheral edge, in that a die with a contour corresponding to the desired radius (r) of the radial embossing (R) is pressed along the inner face against the peripheral edge;
wherein the die travels at least once along the complete peripheral edge, thus travelling along a path corresponding to the contour of the edge, such that all the peripheral edge is provided with the desired radial embossing (R);
wherein simultaneous working of an opposite lower area of an inner edge of the peripheral edge results with the die in addition to the pressing of the radial embossing (R); and
wherein the opposite lower area of the inner edge of the peripheral edge is formed to be tapered by means of a corresponding conical contour of the die.

* * * * *